United States Patent [19]

Block et al.

[11] 3,846,931
[45] Nov. 12, 1974

[54] APPARATUS AND METHOD FOR PRODUCING FISH LURE OF EXTRUDED FISH BAIT COMPOSITION

[76] Inventors: Marshall H. Block, 16016 Vose St., Van Nuys, Calif. 91406; Gerald L. Hubbard, 6701 Sunnybrae Ave., Canoga Park, Calif. 91306; Donald E. Podolor, 3102 Dona Sofia, Studio City, Calif. 91604

[22] Filed: Feb. 5, 1973

[21] Appl. No.: 329,712

[52] U.S. Cl.................... 43/42.53, 43/42.24, 426/1
[51] Int. Cl............................................ A01k 85/00
[58] Field of Search............ 43/42.24, 42.06, 42.53; 426/1; 99/116

[56] References Cited
UNITED STATES PATENTS

| | | | |
|---|---|---|---|
| 2,827,376 | 3/1958 | Breuer | 43/42.24 |
| 2,849,323 | 8/1958 | Young | 426/116 |
| 2,977,231 | 3/1961 | Fox et al. | 426/116 |
| 3,607,294 | 9/1971 | Ernstrom | 426/1 |

Primary Examiner—Warner H. Camp
Attorney, Agent, or Firm—Allan M. Shapiro

[57] ABSTRACT

The fish bait or lure is an extruded composition resembling a natural worm. It is flexible and resilient and is of sufficient strength to be impaled upon a fishhook and withstand normal fishing activities with the hook. The method comprises extruding the wormlike fish bait or lure, and the apparatus comprises the vessel containing the suitable composition and on which is mounted an extrusion nozzle from which can be pressure-extruded the wormlike fish bait or lure.

5 Claims, 4 Drawing Figures

PATENTED NOV 12 1974　　　　　　　　　　　　　　　　3,846,931
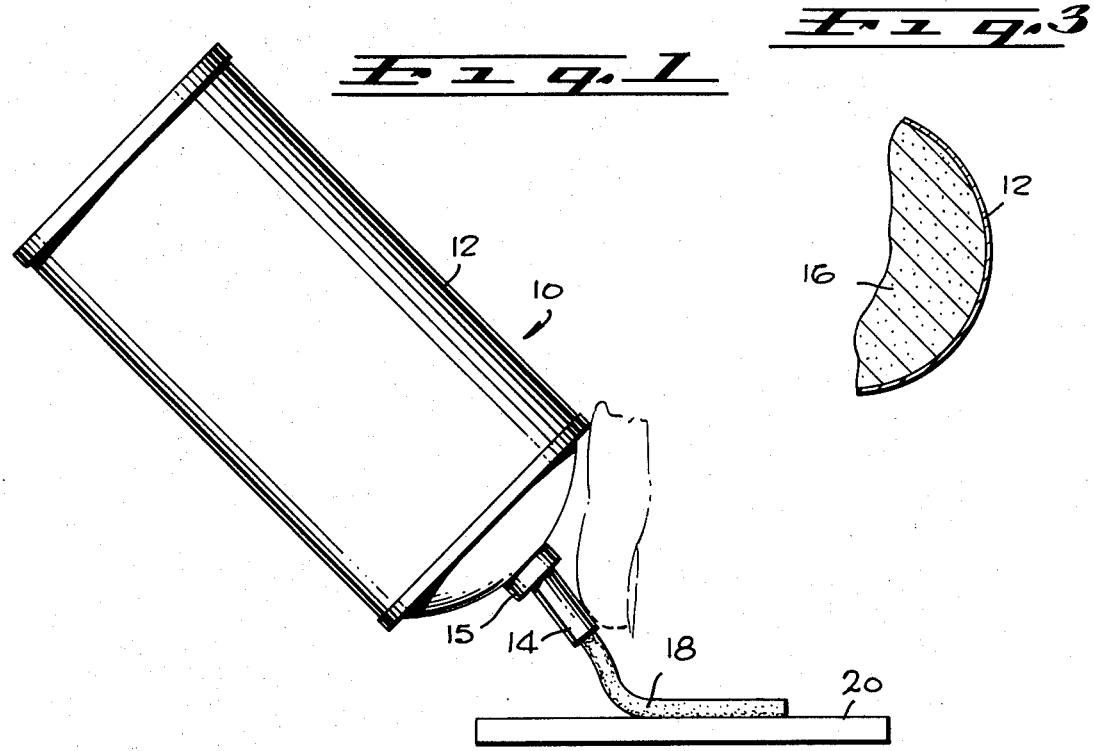
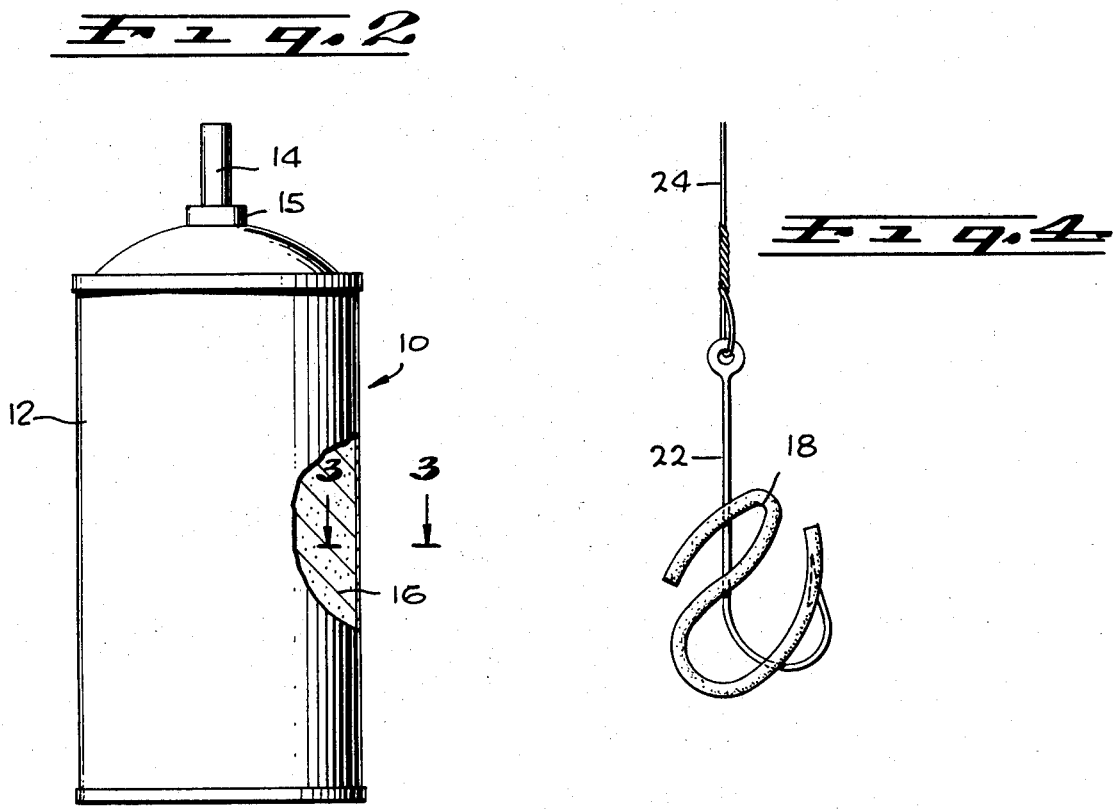

APPARATUS AND METHOD FOR PRODUCING FISH LURE OF EXTRUDED FISH BAIT COMPOSITION

BACKGROUND OF THE INVENTION

1. Field of the Invention

This invention is directed to an extruded wormlike composition fish bait or lure, to its method of extrusion, and to the apparatus by which it can be extruded.

2. Description of the Prior Art

For milennia, man has sought to catch fish for food and for sport. Early in his march through successively higher levels of civilization, man discovered that many varieties of fish could be caught by means of a hook upon which was impaled an article which the fish could be induced to attempt to eat. In his attempts at the successful catching of fish, man has discovered that the feeding drive of fish is the most satisfactory way to catch them on a hook.

As a result of this, lures for the catching of fish have resembled in appearance or smell an item of food importance to the fish being sought. Similarly, baits are items of food importance to the fish from which they can obtain sustenance. The type of bait which most satisfactorily catches fish depends upon the fish species being sought. Minnows are most successful for the larger, carnivorous fish, while insects, worms, and fish eggs are often useful in catching various species of fish of intermediate size. Attempts have been made to create artificial baits in each of these categories.

SUMMARY OF THE INVENTION

In order to aid in the understanding of this invention, it can be stated in essentially summary form that it is directed to an extruded, wormlike composition fish bait or lure of sufficient flexibility and resiliency to give an appearance similar to that of a natural worm and enough strength to be impaled on a fishhook. The method comprises extruding a wormlike fish bait or lure, and the apparatus comprises a vessel containing the composition and carrying a nozzle from which the composition can be pressure-extruded into wormlike form lure.

Accordingly, it is an object of this invention to provide an extruded, wormlike fish bait or lure which has resiliency and strength characteristics similar to those of a natural worm so that it can be impaled upon a hook and used in normal fishing activities, such as casting, trolling, and still-fishing. It is a further object to provide an extruded wormlike fish bait or lure which has the appearance of the normal edible worm to a fish, including the size, shape, and flexibility appearance when in a water environment. It is yet another object of this invention to provide a method by which an extruded, wormlike fish bait or lure can be extruded. It is a further object to provide an extrusion method whereby a composition is pressure-extruded from a vessel through an extrusion nozzle to form an extruded, wormlike fish bait or lure. It is another object to provide an apparatus comprising a vessel containing extrudable fish bait composition and carrying an extrusion nozzle so that the composition can be pressure-extruded out of the nozzle to form a flexible, wormlike fish bait or lure.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

BRIEF DESCRIPTION OF THE DRAWINGS

FIG. 1 is a side elevational view of a pressure extrusion vessel from which a wormlike fish bait or lure is being extruded, in accordance with the method of this invention.

FIG. 2 is a side elevational view of the apparatus, with parts broken away, to show the interior composition.

FIG. 3 is an enlarged section taken generally along the line 3—3 of FIG. 2, with parts broken away, showing part of the apparatus and part of the composition within the vessel.

FIG. 4 is a side elevational view showing an extruded, wormlike fish bait or lure, in accordance with this invention, impaled upon a conventional fishing hook.

DESCRIPTION OF THE PREFERRED EMBODIMENT

FIGS. 1, 2, and 3 illustrate the extrusion apparatus 10 from which the extruded wormlike fish bait or lure of this invention is made. The extrusion apparatus 10 comprises a vessel 12 having an extrusion nozzle 14 thereon. As illustrated in the drawings, the extrusion apparatus 10 is preferably a closed can which can be pressurized and which has a valve formed in association with the extrusion nozzle to control the extrusion of the contents of the vessel out of the extrusion nozzle. In the well-known, modern pressurized can, valve 15 is formed integrally with extrusion nozzle 14 so that, as the extrusion nozzle is pressed to one side out of axial alignment, as illustrated in FIG. 1, valve 15 is opened to permit pressure extrusion of the composition within the vessel out of nozzle 14. Thus, in its preferred embodiment, the extrusion apparatus 10 comprises a structure which is commonly known as an "aerosol can." In such devices, the contents of the can include both the composition to be expelled and the propellant. The propellant in modern aerosol cans depends upon the composition to be expelled. Propane is used in some cases, and one of the Freons, which form a class of halogenated hydrocarbons, is used in other cases. These propellant fluids are liquid at room temperature and at vessel pressure, but gasify to maintain the vessel pressure when contents are discharged. By this means, pressure is maintained through the entire discharge of contents with a minimum starting volume of pressurant and without excessive starting pressure.

Composition 16 is located within vessel 12. It is a part of the starting extrusion apparatus of this invention. Composition 16 is of such characteristics as to properly extrude and to form the extruded wormlike fish bait or lure of this invention. The composition 16 is of suitable compatibility with the propellant so that the extruded fish bait is not significantly reduced in effectiveness by the propellant. On the other hand, separation of the propelling force and the composition 16 could be accomplished, if an improved extruded wormlike fish bait or lure resulted.

FIGS. 1 and 4 illustrate an extruded, wormlike fish bait or lure 18. In FIG. 1, extrusion apparatus 10 is shown as being manually controlled, with extrusion nozzle 14 deflected to permit extrusion of the composition 16 from within the vessel out through the extrusion nozzle to be deposited upon surface 20. As the extrusion proceeds, the apparatus 10 is moved along to lay the extruded fish bait or lure on the surface.

The extruded, wormlike fish bait or lure 18 is of an appropriate length and diameter to resemble a worm. The length of the extrusion is controlled by the fisherman, so that he can achieve a length which is compatible with his quarry and with his hook size. The extruded, wormlike fish bait or lure is extrudable from the pasty, plastic (in the fluidity sense) fluid to result in a flexible, resilient, rubbery fish bait or lure article which has sufficient strength to permit it to be impaled upon a hook and thereupon be employed in conventional fishing. In FIG. 4, fish bait or lure 18 is impaled on hook 22 which is secured on the end of line 24. Fish bait 18 is engaged and impaled upon hook 22, as shown in FIG. 4, by having the fish bait impaled through at spaced positions along its length and thrust onto the shank of the hook, while a portion of the fish bait is engaged upon the point of the hook. When thus engaged on the hook in conventional manner, as illustrated in FIG. 4, the bait or lure may be used in all manner of conventional fishing, including casting, trolling, still-fishing, and bottom-bumping. Extruded fish bait 18 is of such composition as to be substantially unaffected adversely by its use in water so that it does not dissolve away in use.

The method of this invention comprises the steps of pressure-extruding a composition through a nozzle into an extruded, wormlike fish bait or lure. The extended method also includes the steps of placing the extruded, wormlike fish bait or lure upon a hook and fishing therewith.

The composition 16 is any composition which can be extruded to form the wormlike, extruded fish bait or lure of this invention. A particular composition comprises a mixture of starch, fat, wetting agent, and glycerine to form a composition having the proper plasticity in body, resiliency, and strength described above. Certain additional features are believed to aid in the catching of fish, beside the creation of an extruded, wormlike fish bait or lure. These include coloring to make the extruded, wormlike fish bait or lure either natural in appearance or of an appropriately attractive color to attract the attention of the fish. In addition, particular flavoring can be incorporated into the composition. These flavorings include salmon egg oil, cheese, fish oil, and similar flavorings. In the sense used above, the word "flavoring" includes both those materials which provide a desirable flavor to the fish after he has tasted it and/or provide a scent which is sufficiently soluble in the water to attract the fish for at least a short distance.

In accordance with this invention, the apparatus 10 can be carried by a fisherman and, when he wants a bait, he can remove the extrusion apparatus 10 from storage and pressure-extrude from the contents therein an extruded, wormlike fish bait or lure 18. This extruded bait is then impaled on the fisherman's hook in the manner of a natural worm so that fishing can proceed.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. Apparatus for producing an extruded wormlike fish lure, comprising a vessel pressurized with a pressurant and having means including a fish bait composition in said vessel and an extrusion nozzle connected to said vessel for extruding from said vessel a fish lure of said composition that is wormlike in length, diameter, flexibility, resiliency, rubberiness, and strength sufficient to permit the lure to be impaled upon a fishhook and immersed in water while maintaining its wormlike form.

2. Apparatus in accordance with claim 1, wherein said fish bait composition is wormlike in color and includes a flavoring attactive to fish.

3. Apparatus in accordance with claim 1, wherein said means includes a manually actuated valve for controlling communication between said nozzle and the interior of said vessel.

4. A method of producing a wormlike fish lure, which comprises providing a pressurized vessel having an extrusion nozzle and containing a fish bait composition, and pressure-extruding through said nozzle from said vessel a fish lure of said composition that is wormlike in length, diameter, flexibility, resiliency, rubberiness, and strength sufficient to permit the lure to be impaled upon a fishhook and immersed in water while maintaining its wormlike form.

5. A process in accordance with claim 4, wherein the pressure-extruding includes opening a valve controlling the communication between the nozzle and the interior of the vessel to permit a pressurant in the vessel to force the composition through the nozzle.

* * * * *